United States Patent Office 3,808,200
Patented Apr. 30, 1974

3,808,200
HEXITOL, GLUCOSE AND SUCROSE ESTERS OF α-SULFO FATTY ACIDS
Raymond G. Bistline, Jr., Philadelphia, Frank D. Smith, Southampton, James K. Weil, North Wales, and Alexander J. Stirton, Philadelphia, Pa., assignors to the United States of America as represented by the Secretary of Agriculture
No Drawing. Original application July 29, 1969, Ser. No. 845,896, now abandoned. Divided and this application Jan. 7, 1971, Ser. No. 104,774
Int. Cl. C07c 69/32
U.S. Cl. 260—234 R  4 Claims

ABSTRACT OF THE DISCLOSURE

Esters of α-sulfo fatty acids with mannitol, sorbitol, glucose and sucrose were prepared by direct esterification, acid chloride, or alcoholysis methods. The products are easily soluble, biodegradable, anionic surface active agents with foaming, detergent, emulsifying and lime soap dispersing properties and excellent stability to metal ions and to acid or alkaline hydrolysis.

---

A non-exclusive, irrevocable, royalty-free license in the invention herein described, throughout the world for all purposes of the United States Government, with the power to grant sublicenses for such purposes, is hereby granted to the Government of the United States of America.

This application is a division of our copending application for patent, Ser. No. 845,896, filed July 29, 1969, now abandoned.

This invention relates to esters of α-sulfo acids with certain polyols and carbohydrates, and to their preparation and use as surface active agents.

One object of the invention is to prepare sodium salts of mono-, di- and polyesters of long chain α-sulfo fatty acids with selected hexitols, aldohexoses and disaccharides.

Another object is to prepare esters of α-sulfo acids with polyols and carbohydrates which are surface active, biodegradable, easily soluble in water, resistant to hydrolysis and useful in the formulation of solid or liquid household detergents, in soap-detergent combinations, and as surface active agents for industrial application.

According to this invention, the above objects are achieved by esterifying the selected polyol or carbohydrate with an α-sulfo fatty acid by direct esterification, by the acid chloride method or by the alcoholysis method.

The α-sulfo acids to which our invention relates are long chain α-sulfo fatty acids of the general formula $CH_3(CH_2)_nCH(SO_3H)CO_2H$ where $n$ is an integer from 6 to 21, inclusive, that is from α-sulfopelargonic acid to α-sulfolignoceric acid. The α-sulfo acid

[$RCH(SO_3H)CO_2H$], mono- or disodium salt

[$RCH(SO_3Na)CO_2H$, $RCH(SO_3Na)CO_2Na$]

or methyl ester [$RCH(SO_3Na)CO_2CH_3$] may be prepared as described in the literature [A. J. Stirton. J. Am. Oil Chemists' Soc., 39, 490–496 (1962)] or a commercially available product may be used. The hexitol may be selected from a group of 10 stereoisomeric forms the most common of which are D-mannitol and D-glucitol:

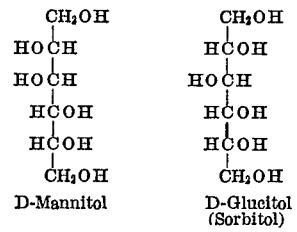

The aldohexoses may be selected from a group of 16 stereoisomeric forms (D- and L-allose, altrose, glucose, mannose, gulose, idose, galactose and talose) the most common of which are glucose, mannose and galactose:

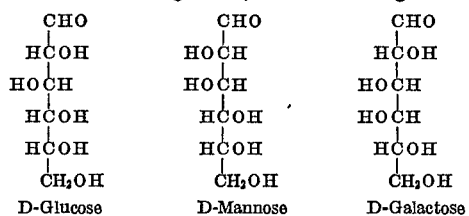

The disaccharide may be selected from the 4 most common, that is sucrose, lactose, maltose and cellobiose.

In a preferred embodiment of our invention the α-sulfo acids are α-sulfopalmitic acid or α-sulfostearic acid, or a mixture of the two, obtained from the sulfonation of commercial stearic acid or hydrogenated tallow fatty acid. In a preferred embodiment of our invention the hexitol is D-mannitol or D-glucitol or a commercial sorbitol from the electrochemical reduction or catalytic hydrogenation of carbohydrates; the aldohexose is D-glucose (dextrose) and the disaccharide is sucrose. Further, in a preferred embodiment of our invention the sucrose ester is a monoester or predominantly monoester and the hexitol ester is preferably primarily a monoester of a primary alcohol or primarily a diester of both of the primary alcohol groups.

We have discovered that the method of preparation employed depends upon the product to be desired. The number of possible monoesters for mannitol, because of symmetry, its 3, and the number of possible diesters is 9. Sorbitol could form 6 different monoesters or 15 different diesters. Despite this we have discovered that a process in which the α-sulfo acid acts as its own esterification catalyst gives a 60% yield of the 1,6-diester as illustrated:

(1) $RCHCO_2H + C_6H_{14}O_6 \longrightarrow$
      |
      $SO_3H$

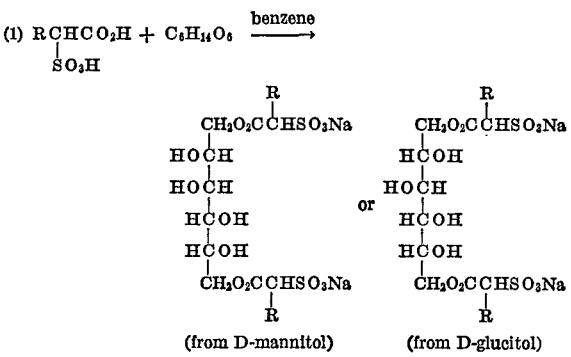

The acid chloride method, we have discovered, can be directed to give a product which is primarily the monoester, with esterification at the primary alcohol group:

(2)
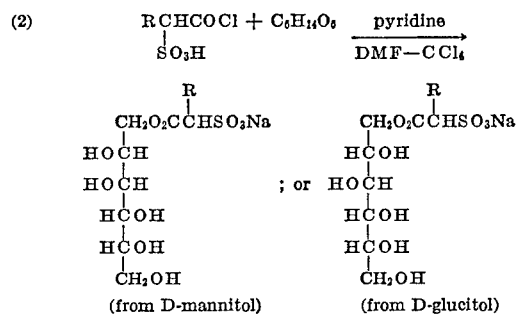

and

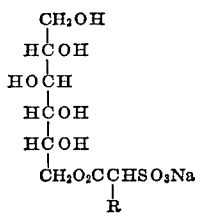

Despite the fact that primary alcohols are more readily esterified, some esterification at secondary alcohol groups may also be possible because of the great reactivity of the acid chloride.

The alcoholysis method, we have discovered, also leads primarily to monoesterification at primary alcohol groups. This is a gentler reaction and less esterification at secondary alcohol groups is to be expected:

(3)
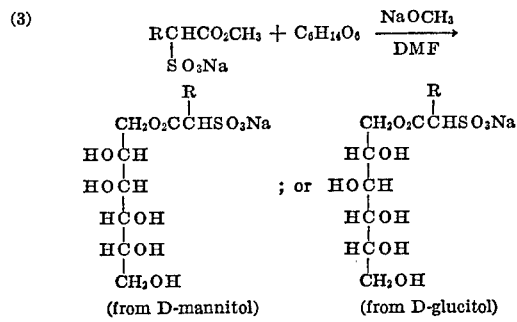

and

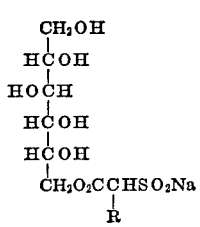

Evidence for the structural assignments shown in Equations 1–3 are elementary analyses on the products and the known greater reactivity of primary compared to secondary alcohol groups [E. Reinefeld and G. Klauenberg, Tens., 5, 266–270 (1968)].

In the case of α-sulfo esters of an aldohexose the product from the alcoholysis of D-glucose is essentially a monoester of a primary alcohol:

(4)
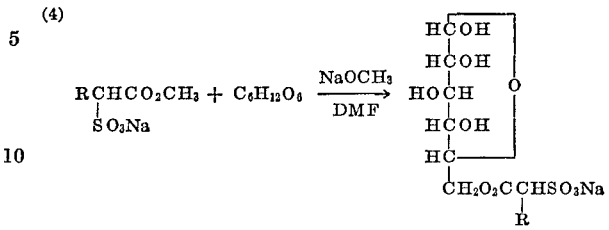

Because of charring, direct esterification of sucrose with an α-sulfo acid is not possible and only acid chloride and alcoholysis methods were successful. From the structure of sucrose there are 8 possible monoesters and 28 possible diesters, calculated from the formula $$\frac{n(n-1)}{21} = \frac{8 \times 7}{1 \times 2} = 28$$

Despite this complexity it has been possible in the case of the acid chloride method to isolate a fraction which is essentially a monoester or composed principally of monoesters at the primary alcohol group:

(5)
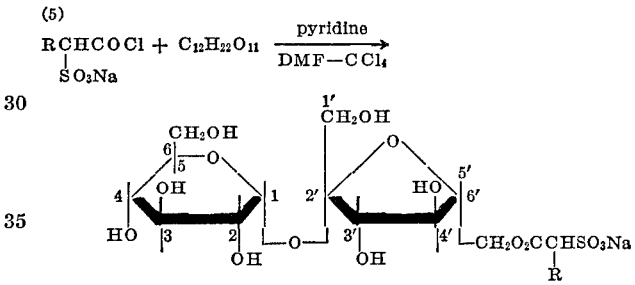

Fractions which are less water soluble are also formed and these appear to be diesters and polyesters with esterification at both primary and secondary hydroxyl groups.

The alcoholysis method was found to lead to a product which was primarily a monoester with less evidence of diester and polyester formulation. From a elemental analyses, the known greater reactivity of primary alcohol groups and the structure assigned to sucrose monomyristate [R. U. Lemieux and A. G. McInnes. Can. J. Chem., 40, 307–309 (1967)], the product is principally a mixture of monoesters with esterification mainly at the 6′ and 6-hydroxyl groups:

(6)
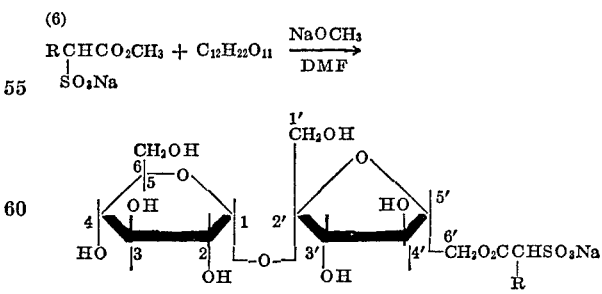

The α-sulfo esters of our invention differ greatly from corresponding esters of normal fatty acids, saturated or unsaturated or containing hydroxyl groups such as esters of stearic, oleic, linoleic or ricinoleic acid. The pressure of the sulfo group makes the ester an anionic rather than a nonionic surface active agent with a great change in properties and types of application. Compared to corresponding esters of normal fatty acids the α-sulfo esters are more soluble and more resistant to acid or alkaline hydrolysis. Diesters and polyester of α-sulfo acids are surface active and water soluble and separation of monoesters from di- or polyesters may not be necessary in order to have a useful product. In contrast sucrose distearate, for example, is not sufficiently soluble in water to give evidence of surface active properties.

The α-sulfo esters of hexitols, hexoses, and disaccharides prepared by the methods of our invention, and the elemental analyses are listed in Table I. Although the products in every case are not single isomers we have found that the methods of our invention lead to products of acceptable purity Some analysis for suspected impurities is possible. The sucrose esters from the alcoholysis reaction, in particular, have remarkable solubilizing properties and are able to solubilize the reactants so that complete separation is not possible except with undue loss in yield.

Disodium salt present was calculated based on comparison of infrared absorbancy ratio C=O/COO⁻ with that for known mixtures of methyl ester

and disodium salt RCH(SO₃Na)CO₂Na. Methyl ester present was calculated by saponification, collection of the methanol-water distillate and comparison with reference density tables. Total sucrose, free and combined, was determined by optical rotation. These data combined with elemental analyses gave the results of Table II.

Surface active and related properties were measured on the α-sulfo esters of our invention and compared with reference compounds as shown in Table III.

From Table III it is evident that the α-sulfo esters of the hexitols, hexoses and disaccharides, specifically in this case the α-sulfo esters of mannitol, sorbitol, glucose and sucrose, in comparison with sodium methyl α-sulfostearate and sucrose monopalmitate, are much more water soluble and therefore more generally useful as detergents and surface active agents. The mannitol, sorbitol glucose and sucrose esters have better foaming properties than the nonionic sucrose monopalmitate and are about equal in detergency and lime soap dispersing properties.

The α-sulfo esters of our invention are easily soluble and therefore generally compatible with other detergents, surface active agents and metal salts. A standard metal ion stability test [J. C. Harris, ASTM Bull. No. 141, 49–53 (1946)] showed α-sulfo mono- or diesters of mannitol or sorbitol stable, without precipitation, in the presence of $Mg^{++}$, $Fe^{++}$, $Ni^{++}$, $Cu^{++}$ and $Zn^{++}$ ions. This is true also of the sucrose α-sulfo esters.

The α-sulfo esters of our invention have many unexpected and important advantages over corresponding simple fatty acid esters of polyols and carbohydrates, such as sorbitol monostearate, sorbitol distearate, glucose monostearate, and sucrose monostearate. They are much more soluble as can be seen in Table III, they have both nonionic and anionic properties, they are much more stable to acid or alkaline hydrolysis, and they are able to solubilize less soluble compounds, including other detergents and surface active agents. All of these advantages make them more generally useful by themselves or in admixture with other components under a wide variety of conditions. Stability to alkaline hydrolysis is shown in the kinetic studies of Table IV. All of the α-sulfo esters of our invention, the mannitol and sorbitol mono- and diesters, and the glucose and sucrose esters, have the advantage of stability to both acid and alkaline hydrolysis.

The ability to solubilize detergents or surface active agents or other compounds which by themselves have somewhat limited solubility makes the α-sulfo esters of our invention very useful in formulations.

Sodium methyl α-sulfostearate is a useful detergent and surface active agent but as shown in Table III it has limited solubility, only 0.2% at room temperature, and so cannot easily enter into all types of formulations, for example liquid detergent formulations. Experiments have now shown that the α-sulfo esters of our invention, at 10% concentration, can solubilize up to 10% of sodium methyl α-sulfostearate. Other more difficultly soluble detergents whose presence is very desirable in liquid detergent formulations can be solubilized as well, such as hydrogenated tallow alcohol sulfates.

The following examples illustrate but do not limit the nature and scope of our invention.

EXAMPLE 1.—Mannitol, DI-(α-sulfostearate)

Direct esterification method

A heterogeneous mixture of 28 g. (0.154 mole) of D-mannitol, 22 g. (0.060 mole) of α-sulfostearic acid, and 100 ml. of benzene was stirred and heated at reflux temperature for 4 hrs. with azeotropic removal of water. The mixture was cooled, diluted with cold 95% ethanol, neutralized with 18 N sodium hydroxide and heated to 60° C. Disodium α-sulfostearate and excess mannitol were filtered from the hot solution. After standing at −30° C., crystallized solids (37 g.) were removed, washed, and dried, and recrystallized from absolute ethanol to give 19 g. (70%) of white solid with the analysis and properties shown in Tables I and III. Mannitol di-(α-sulfopalmitate), sorbitol di-(α-sulfopalmitate) and sorbitol di-(α-sulfostearate) all with the analyses and properties shown in Tables I and III, were prepared in a similar manner.

EXAMPLE 2.— Sorbitol mono-α-sulfopalmitate

Acid chloride method

A solution of 80 g. of disodium α-sulfopalmitate (0.21 mole) in 400 ml. of freshly distilled thionyl chloride was heated 15 minutes at reflux temperature. Excess thionyl chloride was removed by distillation and the residue was dried to a rotary evaporator at 100° C. and 1 mm. pressure. A solution of the acid chloride in 500 ml. of carbon tetrachloride was added dropwise a stirred mixture of 48 g. of sorbitol (0.26 mole) in 190 ml. of dimethylformamide and 50 ml. of pyridine during 20 minutes at 60–70° C. The reaction mixture was stirred and heated a further 15 minutes, cooled, diluted with 500 ml. of 50% ethanol and neutralized, at 10° C., with 18 N sodium hydroxide. Repeated extraction with carbon tetrachloride and aqueous ethanol gave a carbon tetrachloride layer containing di- and polyesters. Low temperature crystallization from the aqueous ethanol layer and removal of sorbitol and disodium α-sulfopalmitate on the basis of their insolubility to absolute ethanol gave sorbitol mono-α-sulfopalmitate, presumably principally a mixture of the 1- and 6-monoesters, yield 36%. Analyses and properties are shown in Tables I and III.

EXAMPLE 3.—Sucrose mono α-sulfostearate

Acid chloride method

A solution of 100 g. disodium α-sulfostearate (0.245 mole) in 400 ml. of freshly distilled thionyl chloride was refluxed for 15 minutes, excess of thionyl chloride was removed by distillation and the residue was dried in a rotary evaporator at 100° C. and 1 mm. A solution of the acid chloride in 500 ml. of carbon tetrachloride was added dropwise to a stirred mixture of 84 g. of sucrose (0.245 mole) in 335 ml. of dimethylformamide and 44 ml. of pyridine, during 25 minutes at 60–70° C. The mixture was stirred and heated a further 15 minutes, cooled, diluted with 500 ml. of 50% ethanol and neutralized, at 10° C., with 18 N sodium hydroxide. Repeated extraction with carbon tetrachloride and aqueous ethanol gave a carbon tetrachloride layer containing di- and polyesters. Low temperature crystallization from the aqueous ethanol layer and removal of disodium α-sulfostearate on the basis of insolubility in absolute ethanol gave sucrose mono-α-sulfostearate, presumably principally a mixture of the monoestesr of the 6', 6 and 1' primary alcohol groups. With correction for recovered disodium α-sulfostearate the yield was 45%. Sucrose mono-α-sulfopalmitate was prepared in a similar manner. Analyses and properties of both sucrose esters are shown in Tables I and III.

EXAMPLE 4.—Sorbitol mono-α-sulfostearate

Alcoholysis method

A carefully dried mixture of 27 g. of sorbitol (D-glucitol, 0.148 mole) and 51 g. of sodium methyl α-sulfostearate (0.127 mole) was dissolved in 100 ml. of dimethylformamide, 0.5 g. of sodium methoxide catalyst was added, and the reaction mixture was heated and stirred 4 hrs. at 85–100° C. with removal of methanol. The solvent was removed under reduced pressure, treated with boiling absolute ethanol and filtered to remove excess sorbitol and a small amount of disodium α-sulfostearate. Crystallizaiton from the filtrate at −20° C. gave sorbitol mono-α-sulfostearate, yield 73%, purity 78% with the analysis and properties shown in Tables I, II, and III. Mannitol mono-α-sulfopalmitate, sorbitol mono-α-sulfopalmitate, and mannitol mono-α-sulfostearate were prepared in a similar manner.

EXAMPLE 5.—Glucose mono-α-sulfopalmitate

Alcoholysis method

Glucose, 30 g. (dextrose, analytical grade, 0.168 mole) and 50 g. of sodium methyl α-sulfopalmitate (0.134 mole) were dried at 100° C. at 0.1 mm. pressure for 2 hrs. and dissolved in 100 ml. of dimethylformamide. Sodium methoxide catalyst, 0.5 g. was added and the mixture was stirred and heated for 5 hrs. at 100° C. with removal of methanol at 40 mm. Solvent was removed at 0.1 mm., and the glassy residue was heated and stirred with absolute ethanol and filtered to remove insoluble glucose and disodium α-sulfopalmitate. Crystallization from the filtrate gave glucose mono-α-sulfopalmitate, yield 55%, with the analysis and properties shown in Tables I and III. Glucose mono-α-sulfostearate was prepared in a similar manner.

EXAMPLE 6.—Sucrose mono-α-sulfopalmitate

Alcoholysis method

Sucrose 50 g. (10× grade, 0.146 mole) and sodium methyl α-sulfopalmitate 50 g. (0.134 mole) were dried at 100° C. at 3 mm. pressure and dissolved in 100 ml. of dimethylformamide. Sodium methoxide catalyst, 0.5 g., was added and the mixture was heated and stirred 6 hrs. at 100° C., removing methanol at 40 mm. pressure, and finally dimethylformamide at 0.1 mm. The glassy residue was treated with hot absolute ethanol and filtered to remove insoluble sucrose and disodium α-sulfopalmitate. Crystallization from the filtrate at −20° gave sucrose mono-α-sulfopalmitate, yield 67%, with analysis and properties shown in Tables I and III. Sucrose mono-α-sulfostearate was prepared in a similar manner. As shown in Table II the sucrose esters from the alcoholysis reaction, because of solubilizatiion, may contain sucrose, methyl ester, and disodium salt. Further purification is possible by solution in 10% ethanol and removal of the methyl ester by overnight crystallization.

TABLE I.—HEXITOL, HEXOSE AND SUCROSE ESTERS

| | Esters [2] | Esterification method | Elemental analysis, percent | | | | | | | |
|---|---|---|---|---|---|---|---|---|---|---|
| | | | Found | | | | Theory | | | |
| | | | C | H | Na | S | C | H | Na | S |
| 1 | Sorbitol α-sulfopalmitate | Acid chloride | 50.54 | 8.88 | 4.43 | 6.37 | 50.56 | 8.29 | 4.40 | 6.14 |
| 2 | Mannitol α-sulfopalmitate | Alcoholysis | 50.38 | 8.63 | 4.32 | 6.14 | 50.56 | 8.29 | 4.40 | 6.14 |
| 3 | Sorbitol α-sulfopalmitate | do | 49.86 | 8.62 | 4.69 | 6.00 | 50.56 | 8.29 | 4.40 | 6.14 |
| 4 | Mannitol α-sulfostearate | do | 51.24 | 8.77 | 4.06 | 5.83 | 52.34 | 8.60 | 4.18 | 5.82 |
| 5 | Sorbitol α-sulfostearate | do | 52.08 | 8.75 | 4.28 | 5.75 | 52.34 | 8.60 | 4.18 | 5.82 |
| 6 | Glucose α-sulfopalmitate | do | 49.76 | 8.19 | 4.41 | 5.97 | 50.75 | 7.94 | 4.42 | 6.16 |
| 7 | Sucrose α-sulfopalmitate | Acid chloride | 48.65 | 7.94 | 3.53 | 5.00 | 49.25 | 7.53 | 3.37 | 4.70 |
| 8 | do | Alcoholysis | 48.53 | 7.85 | 3.45 | 4.69 | 49.25 | 7.53 | 3.37 | 4.70 |
| 9 | Sucrose α-sulfostearate | Acid chloride | 49.65 | 8.15 | 3.25 | 4.47 | 50.69 | 7.80 | 3.24 | 4.51 |
| 10 | do | Alcoholysis | 49.30 | 7.91 | 3.59 | 4.47 | 50.69 | 7.80 | 3.24 | 4.51 |
| 11 | Mannitol α-sulfopalmitate | Direct | 53.06 | 8.28 | 5.35 | 7.90 | 52.63 | 8.37 | 5.33 | 7.40 |
| 17 | Sorbitol α-sulfopalmitate | do | 53.32 | 8.21 | 5.19 | 7.75 | 52.63 | 8.37 | 5.33 | 7.40 |
| 13 | Mannitol α-sulfostearate | do | 54.50 | 8.47 | 4.59 | 6.62 | 54.88 | 8.77 | 5.00 | 6.98 |
| 14 | Sorbitol α-sulfostearate | do | 53.98 | 8.24 | 4.74 | 6.96 | 54.88 | 8.77 | 5.00 | 6.98 |

[2] Esters 1–10 are monoesters, esters 11–14 are diesters.

TABLE II.—ANALYSIS OF ESTERS FROM THE ALCOHOLYSIS REACTION

| Preparation | Percent | | | |
|---|---|---|---|---|
| | Sodium methyl α-sulfostearate | Disodium α-sulfostearate | Hexitol or sucrose | Monoester of hexitol or sucrose |
| Sodium mannitol α-sulfostearate | 4 | 2 | 6 | 88 |
| Sodium sorbitol α-sulfostearate | 12 | 3 | 7 | 78 |
| Sodium sucrose α-sulfostearate | 10 | 5 | 15 | 70 |

TABLE III.—SURFACE ACTIVE PROPERTIES

| | α-Sulfo ester [a] and reference compounds [b] | Esterification method | Solubility [c] 25° C., percent | Ca++ stability,[d] p.p.m. CaCO$_3$ | Lime soap dispersing power [e] percent | Foam height [f] 60° C., mm. | Detergency [g] 60° C., ΔR |
|---|---|---|---|---|---|---|---|
| 1 | Sorbitol α-sulfopalmitate | Acid chloride | 20 | 630 | 14 | 170 | 31 |
| 2 | Mannitol α-sulfostearate | Alcoholysis | 20 | 1,500 | 10 | 170 | 32 |
| 3 | Sorbitol α-sulfosterate | do | 20 | 650 | 14 | 180 | 31 |
| 4 | Mannitol α-sulfostearate | Direct | 20 | >1,800 | 10 | 120 | 27 |
| 5 | Sorbitol α-sulfostearate | do | 20 | >1,800 | 10 | 170 | 27 |
| 6 | Glucose α-sulfopalmitate | Alcohclysis | 20 | 1,630 | 8 | 210 | 34 |
| 7 | Sucrose α-sulfopalmitate | Acid chloride | 20 | >1,800 | 9 | 160 | 28 |
| 8 | Sucrose α-sulfostearate | Alcoholysis | 20 | >1,800 | 10 | 180 | 31 |
| | Sodium methyl α-sulfostearate | | 0.2 | >1,800 | 9 | 180 | 35 |
| | Sucrose monopalmitate [h] | | 0.5 | (i) | 9 | 50 | 30 |

[a] Esters #4 and #5 are diesters, all others are monoesters.
[b] 9 and 10 are the reference compounds.
[c] The 20% solutions are clear and maximum solubility may be even greater.
[d] Modified Hart method, Ind. Eng. Chem. 29, 1234–1239 (1937).
[e] Method of Borghetty, J. Am. Oil Chemists' Soc. 27, 88–90 (1950).
[f] Ross Miles test (Oil & Soap 18, 99–102 (1941) on built solutions (0.05% active ingredient plus 0.20% builder) in hard water of 300 p.p.m.
[g] Increase in reflectance after washing standard soiled cotton in 0.25% built solutions (0.05% active ingredient plus 0.20% builder) in hard water of 300 p.p.m.
[h] Commercial sample.
[i] Solution is too turbid for the test method.

TABLE IV.—STABILITY TO HYDROLYSIS

[Solutions 0.1 N with respect to NaOH and ester at 100° C.]

| | Alkaline hydrolysis | | Time in minutes for 50% hydrolysis $t_{1/2}$ |
|---|---|---|---|
| | $k_2$ a | Comparative rate | |
| Sucrose monotallowate | 8.0 | 100 | 1.3 |
| Sucrose mono-α-sulfostearate | 0.39 | 5 | 26.0 |
| Sodium 2-sulfoethyl oleate $C_{17}H_{33}CO_2CH_2CH_2SO_3Na$ | 4.3 | 55 | 2.3 | a Second order reaction rate constant, $k_2 = 1/t \ x/a(x-a)$ in liters per mole per minute.

We claim:
1. Sodium sucrose α-sulfopalmitate.
2. Sodium glucose α-sulfopalmitate.
3. Sodium sucrose α-sulfostearate.
4. Sodium glucose α-sulfostearate.

References Cited

UNITED STATES PATENTS 3,632,804   1/1972   Gray et al. _____ 260—234 R

JOHNNIE R. BROWN, Primary Examiner

U.S. Cl. X.R.

252—89, 353